Dec. 30, 1958  R. R. KUPER  2,866,564
MATERIAL UNLOADING MACHINE
Filed Jan. 2, 1957  6 Sheets-Sheet 1

Inventor
Rudolph R. Kuper
by Crum Koppel
Attorney

Dec. 30, 1958 R. R. KUPER 2,866,564
MATERIAL UNLOADING MACHINE
Filed Jan. 2, 1957 6 Sheets-Sheet 3

Dec. 30, 1958 R. R. KUPER 2,866,564
MATERIAL UNLOADING MACHINE
Filed Jan. 2, 1957 6 Sheets-Sheet 4

Inventor
Rudolph R. Kuper
by Erwin Koppel
Attorney

Dec. 30, 1958　　　　R. R. KUPER　　　　2,866,564
MATERIAL UNLOADING MACHINE
Filed Jan. 2, 1957　　　　　　　　　　6 Sheets-Sheet 5

Inventor
Rudolph R. Kuper
by Erwin Koppel
Attorney

Fig. 14

United States Patent Office 2,866,564
Patented Dec. 30, 1958

2,866,564

MATERIAL UNLOADING MACHINE

Rudolph R. Kuper, Fox Point, Wis.

Application January 2, 1957, Serial No. 632,238

8 Claims. (Cl. 214—16.4)

The subject invention is directed to material unloading machines and is particularly concerned with machines that are operable for continuous unloading of material from a succession of carriers.

In the manufacture of masonry units such as concrete block, the blocks are molded by a machine and placed on flat sections, known as pallets. The loaded pallets are then removed from the block making machine and stacked vertically on a carrier rack. The block loaded rack is then placed in a kiln for the curing of the blocks. Upon completion of the curing operation the rack is ready to be unloaded. Generally this unloading is done by manual labor, which represents a time consuming and inefficient operation.

After a rack is unloaded manually, it has to be taken over to the block making machine to be loaded again. If the rack is transported by the personnel who unloaded the rack, then the unloading operation will cease and time is lost. Moreover, if additional personnel is used to transport the empty racks back to the block making machine, this means added expense. Also, this constant maneuvering of loaded and unloaded racks presents unnecessary steps in the unloading operation.

Accordingly, it is an object of the present invention to provide a machine to unload material units from a carrier efficiently in a minimum amount of time.

Another object of the present invention is to provide a machine that performs automatically all unloading operations of material units from a carrier.

Still another object of the present invention is to provide a machine that will automatically transport a carrier rack loaded with concrete block to an unloading station, alternately raise and unload various levels of block and transport the carrier rack to a removal station.

A further object of the present invention is to provide a machine that will automatically unload a carrier rack loaded with vertical layers of blocks with the topmost layer being unloaded first and the pallets allowed to remain on the rack.

Another object of the present invention is to provide a machine that will automatically elevate in equal increments a carrier rack loaded with concrete blocks at various levels, unload the blocks at a constant vertical height and lower the carrier in one continuous movement to its original vertical position.

Still another object of the present invention is to provide a machine that will continually and automatically unload material placed at various levels on a carrier while a loaded rack is being positioned for subsequent unloading and the prior unloaded rack is being removed from the machine.

Another object of the present invention is to provide an automatic unloading machine that will allow an unloaded carrier to be transported from an unloading station to a carrier removal station when a previously unloaded carrier is removed from the carrier removal station after a loaded carrier is placed on a carrier receiving station.

A futher object of the present invention is to provide a method of unloading a carrier rack loaded with concrete blocks by transporting the carrier to an unloading station, pushing off the blocks at a constant vertical height as the carrier is elevated in vertical increments, lowering the carrier in a continuous movement and transporting the empty carrier to a carrier removal station.

Still another object of the present invention is to provide a method of continuously unloading a plurality of material units on a carrier by placing a carrier on a conveyor for transportation to a carrier unloading station, unloading material from different levels of the carrier and at the same time placing another loaded carrier on the conveyor, transporting to and removing the unloaded carrier from a carrier removal station after the other carrier has been conveyed to the carrier unloading station and still another loaded carrier has been placed on the conveyor.

Other objects will be apparent from the following description when read in connection with the drawings, in which.

Figure 1:
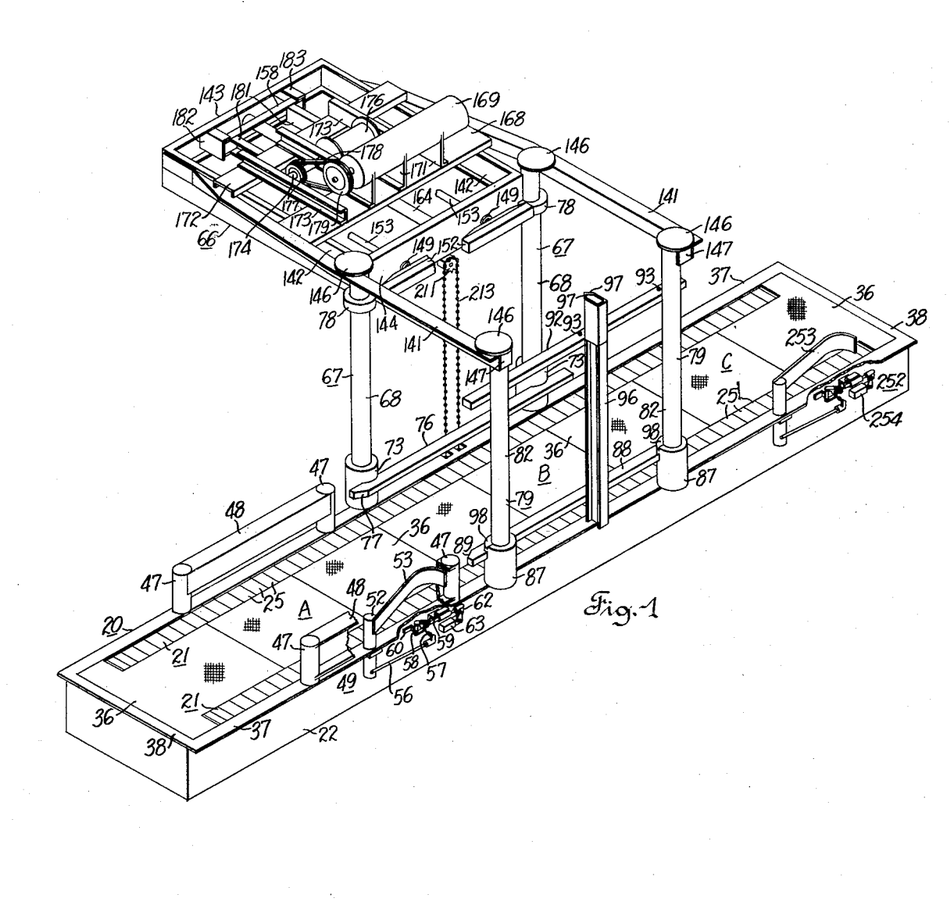
Fig. 1 is an isometric view of the unloading machine with parts of the machine cut away for clarity.
Figure 2:
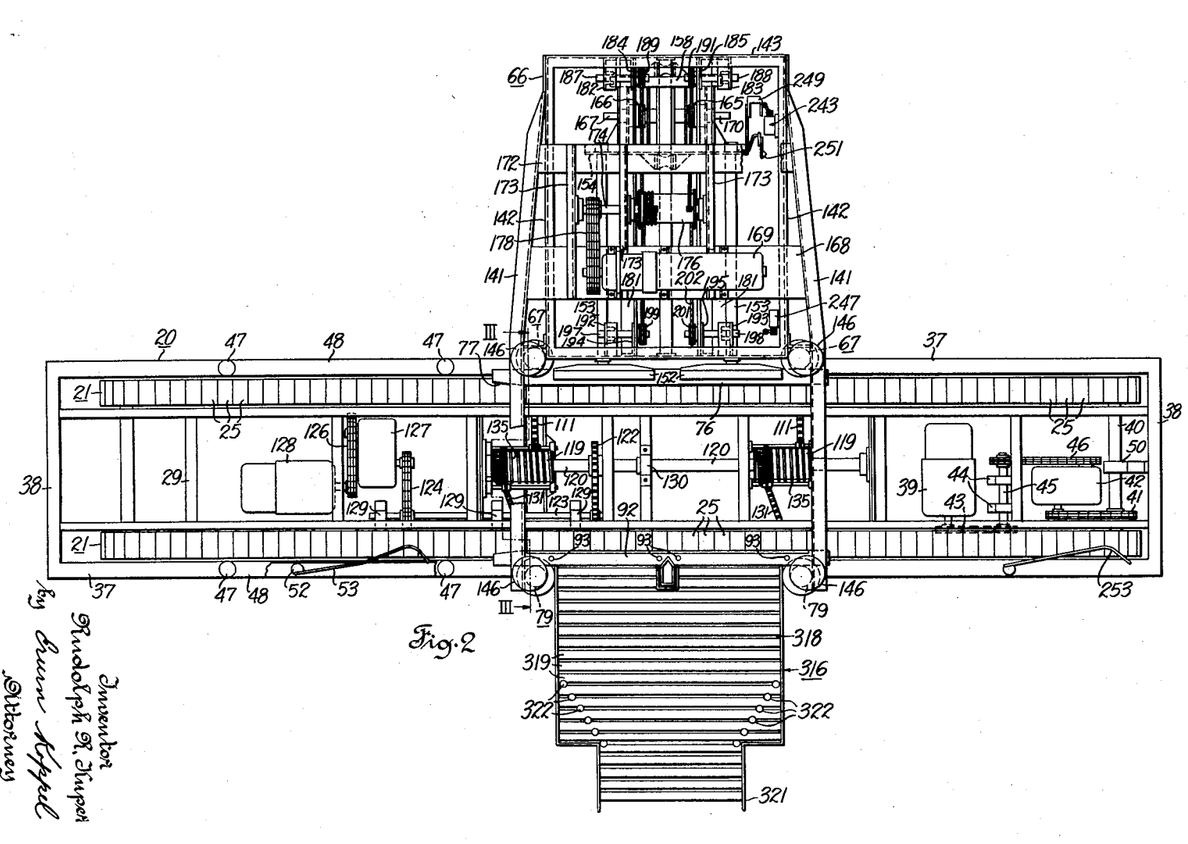
Fig. 2 is a plan view of the unloading machine with the cover plates of the conveyor frame removed and parts of the structure cut away for clarity.
Figure 3:
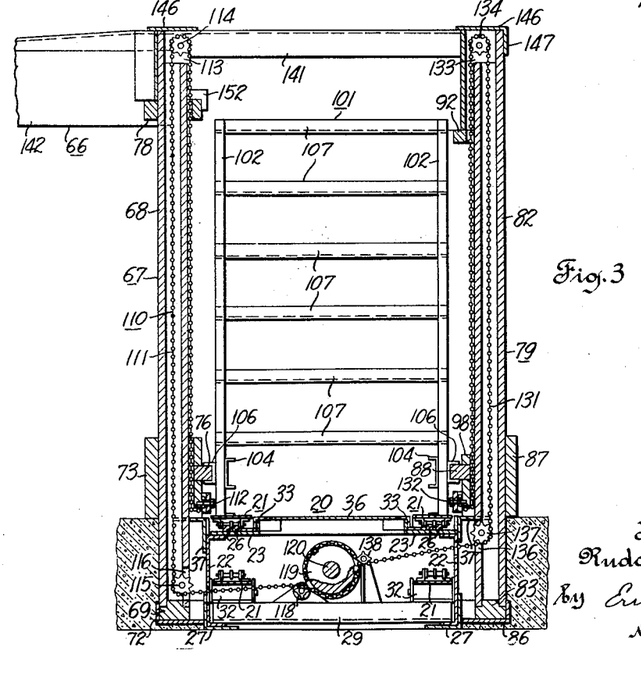
Fig. 3 is a section along line III—III of Fig. 2 with the carrier rack positioned at the carrier unloading station.

Referring to the drawings by characters of reference Figs. 1, 2 and 3 illustrate a longitudinally extending conveyor frame structure 20 on which is mounted an endless conveyor 21 comprising two endless chains of linked steel plates. Frame structure 20 comprises longitudinal side angle irons 22. The upper horizontal short legs of angle irons 22 facing in toward each other form supports for conveyor braces 23 which include longitudinally extending runners 26 to guide and support the chain links 25 of conveyor 21. The lower horizontal short legs of angle irons 22 are mounted on base angle irons 27. Along the inside of longitudinal angle irons 22 are connected a plurality of spaced horizontal braces 29 mounted on the lower short legs of angle irons 22. Braces 29 form a mounting for rollers 32 which support the lower level of endless conveyor 21.

Z-shaped bars 33 are fastened to the tops of conveyor braces 23 and have a top horizontal portion extending inwardly to form a support for cover plates 36 which protect the driving mechanism described hereinafter. Supporting angle irons 37 are mounted on the upper parts of vertical sections 22 and extend outwardly.

Transverse panels 38 connect side angle irons 22 at either end thereof. It should be pointed out that when installed the unloading machine will have the conveyor structure buried so that the floor level will be even with covers 36 as shown in Fig. 3. The fastening of the various parts to each other may be done in any conventional manner, although welding is the preferred construction.

A first power unit shown as motor 39 is mounted between the endless links 25 of conveyor 21 near one end of frame structure 20. Motor 39 is drivingly connected to a gear reducer 42 through transmission drives 43, 46 and shaft 45. Gear reducer 42 drives conveyor shaft 40 through transmission drive 41. Bearings 44 and 50 support and journal shafts 45 and 40, respectively, and shaft 40 transmits the drive to conveyor 21. The desired speed of the conveyor is obtained by changing the gear ratio in the transmission drive.

As shown in Fig. 1 the end of conveyor frame structure 20 on the left hand side of the drawing is designated by the letter A to represent a carrier receiving station. At the other end of conveyor frame structure 20 is a carrier removal station designated by the letter C. Intermediate the ends of conveyor frame structure 20 is a carrier unloading station designated by the letter B.

As shown in Fig. 1 on either side of carrier receiving station A are mounted a pair of guide posts 47 which are connected, respectively, by guide panels 48. One panel 48 on one side of frame 20 has a cut out section providing for the installation of a first switching means 49 which includes a post 52 pivotally mounted in support 37. Fastened at the top section of post 52 is a bumper lever 53 and at the lower section thereof is fastened one end of a longitudinally extending rod 56. A spring 57 is fastened at the other end of rod and ordinarily maintains rod 56 biased toward angle iron 22. However, clockwise pivotal movement of post 52 resulting from movement of lever 53 outwardly in Fig. 1 will cause the other end of rod 56 to swing out to effect a corresponding pivot of one end of a link 58 which is pivotally mounted on angle iron 22 by a bracket 60. A second rod 59 has a pin and slot connection with link 58 so that pivotal movement of link 58 will cause longitudinal movement of rod 59, and projection 62 fastened at the remote end of rod 59 will actuate a switch 63.

An elevated frame structure 66 is vertically spaced and extends transversely to one side of longitudinal frame 20. A pair of hollow supporting assembly members 67 are mounted on frame 20 alongside one angle iron 22 at carrier unloading station B on the side of frame 20 from which frame 66 extends transversely beyond. Supporting members 67 include hollow tubes 68 mounted in base portions 69 which are attached to angle irons 72 which in turn are mounted on one of side angle irons 22. Encircling hollow tubes 68 and slidably mounted thereon are cylindrically shaped, sliding members 73. When the unloading machine is not operating, the sliding members 73 are supported on angle iron 37. A longitudinal bar 76 is mounted in notches formed in the inside portion of sliding members 73. Bar 76 connects members 73 and extends beyond each sliding member 73 with the end extending toward carrier receiving station A having a tapered face 77 on the inside tip portion of bar 76. Stop members 78 encircle and are fixedly mounted near the top of tubes 68.

Figure 12:
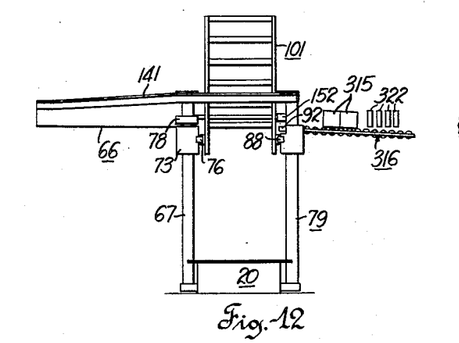
Figure 13:
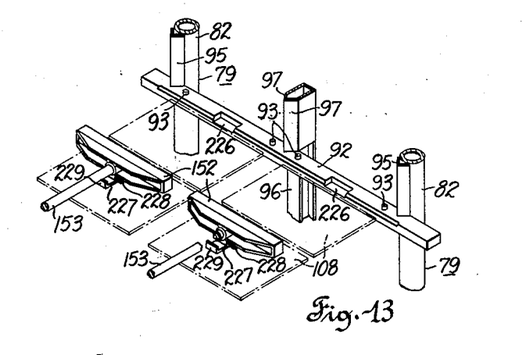
Fig. 13 is an isometric view of a modification of the unloading machine providing for the removal of the pallets from the carrier rack.

Supporting assembly members 79 are similar to supporting members 67 and are mounted on frame 20 alongside the other angle iron 22 at carrier unloading station B on the side of frame 20 opposite to where supporting members 67 are mounted. Supporting members 79 include hollow tubes 82 mounted in base portions 83 which are fastened to angle irons 86 which in turn are mounted on the other side of angle iron 22. Encircling hollow tubes 82 and slidably mounted thereon are cylindrically shaped, sliding members 87. As in the case of supporting members 67 when the unloading machine is not operating, sliding members 87 are supported on angle iron 37. A longitudinal bar 88 is mounted in notches formed in the inside portion of sliding members 87. Bar 88 connects members 87 and extends beyond each sliding member 87 with the end extending toward carrier receiving station A having a tapered face 89 on the inside tip portion of bar 88. A longitudinal brace 92 is mounted on the inside portion near the top of tubes 82 and includes a plurality of protuberances 93 formed in the upper surface of brace 92 (see Fig. 13). Longitudinal rollers (not shown) may be mounted in brace 92 to help in the removal of the material from the carrier, as will be described hereinafter. A vertical brace 96, illustrated in the form of an I-beam, extends upwardly from angle iron 37 between tubes 82 and is connected with brace 92. Part of brace 96 extends further upwardly beyond brace 92 and includes a pair of vertical side portions 97 mounted thereon which are angled at their inside portion to intersect each other on the inside of brace 96. Each support member 79 also includes a pair of vertical flat portions 95 which angle to intersect each other on the inner side of support member 79 above brace 92, as shown in Fig. 13. Vertical portions 95 and 97 aid in guiding material during unloading. It will be noticed that the inside top portion of sliding members 87 include notched sections 98 which will accommodate brace 92 during unloading operation when sliding members 87 slide upwardly on tubes 82 to the position shown in Fig. 12.

Figure 7:
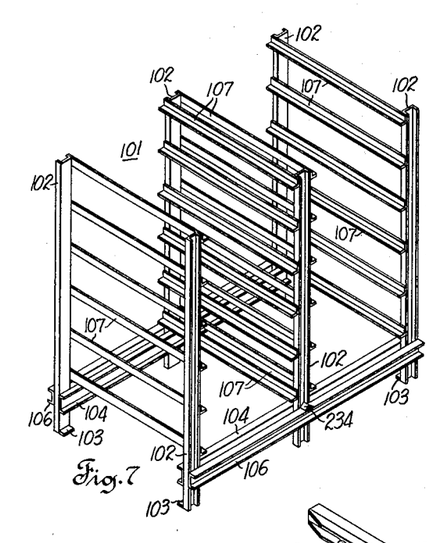
Fig. 7 is an isometric view of a carrier rack.

Elevated frame 66 is fixed in position and supported by support members 67 and 79. The vertical distance of frame 66 from longitudinal frame 20 is determined by the height of the carrier rack used in concrete block production. A typical rack 101 is shown in Fig. 7 and is seen to comprise six vertical U-shaped bars 102 in two parallel rows of three each having feet portions 103 on the inside of the four corner bars. The bars 102 are spaced apart and have horizontal U-shaped bars 104 welded on the inside and near the lower ends of bars 102. Additional horizontal U-shaped bars 106 are welded to the outside of bars 102 at a vertical distance from feet portions 103 of bars 102 corresponding to the vertical distance that longitudinal bars 76 and 88 are spaced above conveyor 21. Accordingly, it is seen in Fig. 3 that when carrier rack 101 is placed on conveyor 21 at carrier receiving station A and moved to carrier unloading station B, U-shaped bars 106 will engagingly receive longitudinal bars 76 and 88.

Six horizontal angle irons 107 are welded at equally spaced vertical intervals to each pair of longitudinal bars 102 across the parallel rows to form supports for pallets 108 (see Fig. 13) which in the conventional rack shown will number twenty-four pallets.

While a conventional rack has been described which is approximately five feet in height with each pallet capable of holding from two to six conventional concrete blocks, depending on the size used, it is to be understood that the subject invention is not to be so limited. Racks of different heights could be unloaded with different size blocks, and racks accommodating only one or three or more vertical rows of pallets could be used without departing from the spirit and scope of the invention, as only a change in the physical dimensions of the rack and the unloading machine need be made.

Vertically movable elevator means 110 illustrated as flexible chains 111 are attached to the sliding members. In Fig. 3 a chain 111 is shown as being positioned partly within hollow tube 68 and partly without the inwardly facing portion thereof. One end of chain 111 is fastened to sliding member 73 by an anchor bolt 112. As shown in Fig. 3 chain 111 extends from anchor bolt 112 upwardly through sliding member 73, lies flat against the inwardly facing surface of hollow tube 68, passes through an opening 113 in hollow tube 68 adjacent the top thereof, then passes over a top sprocket 114 mounted within the top portion of hollow tube 68, extends downwardly through the inside of hollow tube 68, passes around a lower sprocket 115 at the base of hollow tube 68, out through an opening 116 on the inwardly facing surface of hollow tube 68 and over an idler gear 118 to be fastened to a drum 119 drivingly connected to shaft 120. It will be seen from Fig. 2 that shaft 120 is driven through a transmission drive 122 from shaft 123 which is driven through transmission drives 124 and 126 and gear reducer 127 from a second power unit, shown as motor 128. Bearings 129 and 130 support and journal shafts 123 and 120, respectively.

A chain 131 is positioned partly within hollow tube 82 and partly without the inwardly facing portion thereof. One end of chain 131 is fastened to sliding member 87 with an anchor bolt 132. As seen in Fig. 3 chain 131 extends from anchor bolt 132 upwardly through sliding member 87, lies flat against the inwardly facing surface of hollow tube 82, passes through an opening 133 in hollow tube 82 adjacent the top thereof, then passes over a top sprocket 134 mounted within the top portion of hollow tube 82, extends downwardly through the inside of hollow tube 82, passes around a lower sprocket 137 at the base of hollow tube 68, out through an opening 136 on the inwardly facing surface of hollow tube 82 and under an idler gear 138 to be fastened to the same drum 119 to which chain 111 is fastened.

It is seen in Fig. 2 that there are a pair of drums 119, each mounted between a pair of support members 67 and 79 and adapted to wind or unwind a set of chains 111 and 131 in grooves formed by ridges 135 on the periphery of drums 119. Although only one drum and one set of chains 111 and 131 has been described, it is understood that both drums 119 are driven by shaft 120 and operate simultaneously in the same manner to wind or unwind the two sets of chains 111 and 131. Actuation of motor 128 is thus seen to vertically raise and lower sliding members 73 and 87 and also rack 101 when it is positioned on bars 76 and 88.

Elevated frame 66 is mounted on supporting members 67 and 79 by a pair of side frame members, which are illustrated as angle irons 141 positioned parallel to each other directly above longitudinal frame 20. Elevated frame 66 extends transversely to one side of longitudinal frame 20, and the parts of side frame members 141 extending in such manner are angled slightly toward each other, as shown in Fig. 2. Side frame members 141 are fastened to downwardly extending side panels 142, which extend beyond the remote ends of members 141. Rear panel 143 connects side panels 142 at the ends remote from frame 20, and front panel 144 connects the other ends of side panels 142 and is located between hollow tubes 68. Circular portions 146 connect supporting members 67 and 79 with side frame members 141, and an additional connecting flat vertical part 147 further strengthens the connection of panels 141 and supporting members 79.

Horizontal movable means illustrated by a pair of pusher bars 152 are each mounted on one end of a pair of pusher rods 153 which slide in a horizontal plane transverse to longitudinal frame 20 through openings 149 in front panel 144. As more clearly shown in Fig. 8 the other ends of pusher rods 153 are fixed to a first cross bracket 154 forming part of horizontal sliding pusher assembly 155. Horizontally spaced from cross bracket 154 and connected therewith by four parallelly spaced angle iron braces 157 is a second cross bracket 158. Holder brackets 159 and 161, in pairs, are mounted on cross brackets 154 and 161, respectively, for rotative engagement with tubular member 164, which is fixedly mounted in rear panel 143 and front panel 144. Journaled between one pair of angle iron braces 157 on one side of frame 66 is a shaft 167 accommodating a rotatable pulley 166, and journaled between the other pair of angle iron braces 157 on the other side of frame 66 is a shaft 170 accommodating another rotatable pulley 165.

In the stationary part of elevated frame 66 a motor cross bar 168 is mounted between side frame members 141 and positioned adjacent front panel 144. A third power unit shown as motor 169 is supported by motor braces 171 which are attached to motor cross bar 168. A drum cross bar 172 is mounted between side frame members 141 and positioned approximately midway between front panel 144 and rear panel 143. Three brace members 173 are connected between motor cross bar 168 and drum cross bar 172, within which a shaft 174 is journaled. Pusher drum 176 and drum transmission element 177 are rotatably mounted on shaft 174 with a chain drive 178 connecting drum element 177 with a motor transmission element 179. Rotation of motor 169 thereby delivers a direct drive to drum 176.

A pair of additional support bars 181 extend from front panel 144 to rear panel 143 and are positioned above sliding assembly 155 and below brace members 173. On rear panel 143 brackets 182 and 183 along with adjacent angle irons 184 and 185 are mounted to journal shafts 187 and 188 to accommodate pulleys 189 and 191, respectively.

On front panel 144 brackets 192 and 193 along with adjacent angle irons 194 and 195 are mounted to journal shafts 197 and 198 to accommodate pulleys 199 and 201, respectively.

Figure 9:
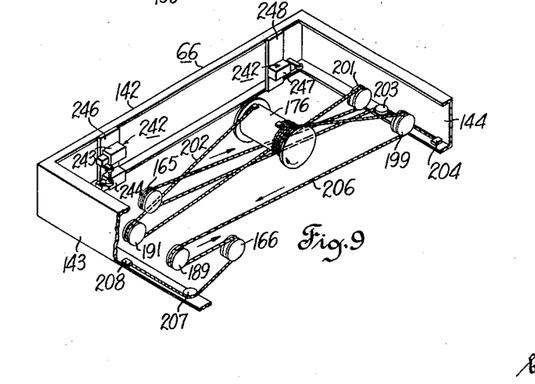
Fig. 9 is an isometric view of part of the transverse elevated frame with certain parts removed for clarity to show the cables and pulleys operating the pusher bars.

As seen in Fig. 9 a flexible cable 202 is anchored at one end on drum 176 and wound around pulleys 191, 201, 165, an idler pulley 203 and anchored at the other end to anchor block 204 fastened to the angle iron projection of front panel 144. A second flexible cable 206 is anchored at one end on drum 176 and wound around pulleys 199, 189, 166, an idler pulley 207 and anchored at the other end to anchor block 208 fastened to the angle iron projection of rear panel 143. Cable 202 is seen to transmit the forward pushing action to pusher assembly 155 through movement of pulley 165 to the right in Fig. 9 when drum 176 is rotated clockwise by motor 169, as shown by the arrow in Fig. 9. During such clockwise rotation of drum 176, cable 202 will be taut as it winds up on drum 176 while cable 206 will be loose. When drum 176 is rotated counterclockwise by motor 169, cable 206 will become taut as it winds up on drum 176 and transmits a reverse movement to pusher assembly 155 through movement of pulley 166 to the left in Fig. 9.

Figure 4:
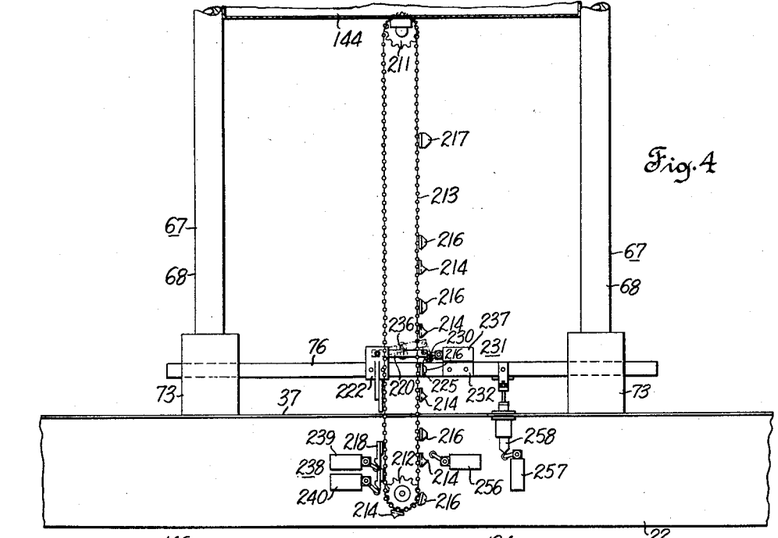
Fig. 4 is an enlarged elevation view of part of the unloading machine including the location of the control switches on the conveyor frame.
Figure 5:
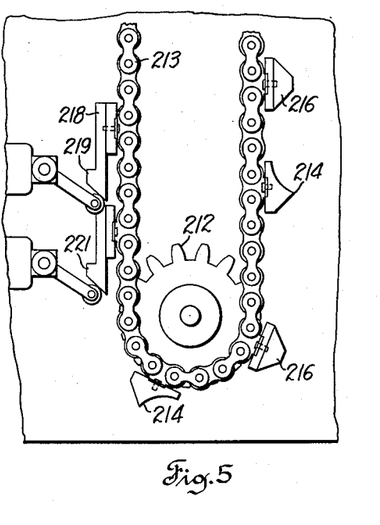
Fig. 5 is an enlarged view of part of the mechanism shown in Fig. 4.

A stationary top sprocket 211 is mounted on the lower part of front panel 144 substantially midway between pusher bars 152, and directly below top sprocket 211, as shown in Figs. 4 and 5, a corresponding lower sprocket 212 is mounted on angle iron 22. Additional positioning means illustrated by an endless chain 213 is fitted around sprockets 211 and 212, and attached thereon at predetermined spacing are a plurality of contacting elements 214 and 216. As shown in Fig. 4 elements 214 and 216 are alternately mounted on chain 213, and in this particular embodiment of the invention five sets of contacting elements 214 and 216 are shown. An additional contacting element 217 is fastened to chain 213 and spaced at one end of the five sets of elements 214 and 216. Although not shown in the drawings elements 214 are in a separate vertical plane spaced from the vertical plane of elements 216. Element 217 projects farther from chain 213 than any element 214 or 216, the purpose of which will be explained hereinafter.

A switch locking block 218 is mounted on chain 213 and comprises projections 219 and 221. Fastening block 222 is mounted on bar 76 with bolts 223 and connects chain 213 and longitudinal bar 76 so that chain 213 with locking block 218 and contacting elements 214, 216 and 217 is in a fixed relationship relative to bar 76, and vertical movement of bar 76 causes chain 213 to be wound clockwise (as viewed in Fig. 4) around sprockets 211 and 212.

Figure 8:
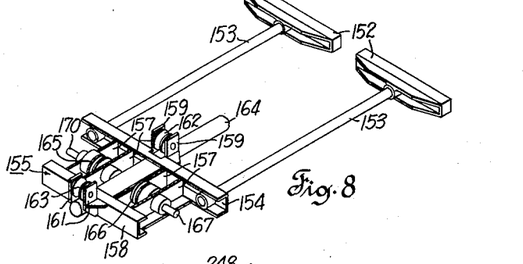
Fig. 8 is an isometric view of the pusher bars which are mounted in the transverse elevated frame.

A modified form of part of the horizontal pushing means is shown in Fig. 13 where like elements shown in the embodiment of Figs. 1 and 8 are given the same numerals. Longitudinal brace 92 includes a pair of recesses 226, each intermediate hollow member 79 and vertical brace 96. On the lower side of each pusher bar 152 and in line with recesses 226 elongated hook members 227 are mounted on hinges 228 and biased to normally extend downwardly. When pusher bars 152 are being extended as shown in Fig. 13, the elongated hinged members 227 are folded up toward pusher rods 153 by contact with horizontal pallets 108. However, when pusher bars 152 are fully extended, as shown in Fig. 12, biased hinge members 227 will drop down into recesses 226 due to the action of the biasing springs (not shown). Upon the return or retraction of pusher bars 152, the hook portion 229 of hinged members 227 will engage pallets 108 and push them toward frame structure 66. The pallets 108 can thus be collected after each transverse unloading operation, and if desired, deposited in a container or magazine (not shown) detachably mounted on the underside of frame 66. After a predetermined number of unloading operations, the loaded magazine could be replaced by an empty magazine, and the loaded magazine placed in the molding machine to have the green concrete blocks placed thereon prior to being placed in the kiln. A further modification would be to rigidly fix elongated members 227 in the normal downwardly extended position to engage one edge of pallet 108 at the start of the unloading operation whereupon transverse pushing action of pusher bars 152 would unload pallets 108 along with the loaded concrete block. Similar removal of the pallets 108 could be accomplished by lowering the face of pusher bars 152 to engage the edge of pallets 108 to remove both pallets and concrete blocks together.

Figure 6:
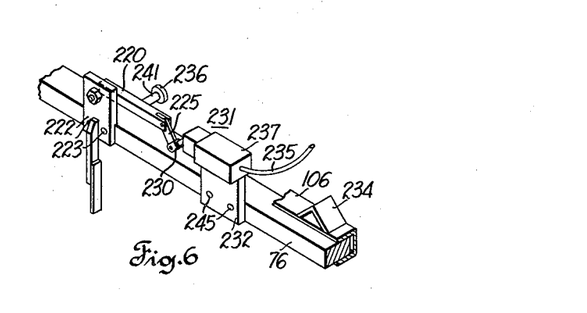
Fig. 6 is an isometric view of one of the circuit controlling switches and its operating linkage.

The electrical control means which can be operated for either individual unloading operation or a continual automatic unloading operation will now be described. As mentioned previously a first switching means 49 is located on frame 20 at carrier receiving station A. As shown in Fig. 4 a second switching means 231 is located on longitudinal bar 76 at carrier unloading station B. Switching means 231 includes a bracket 232 fastened with bolts 245 on longitudinal bar 76 to mount a conventional switch 237. Fastening block 222 has a part extending above bar 76 on which is pivotally mounted one end of a lever arm 220. A first link 225 is pivotally connected at the other end of lever arm 220 and a second link 230 pivotally connects first link 225 to switch 237. Electrical conduit 235 connects switch 237 to the power circuit. Carrier rack 101 includes a wedge shaped projection 234 mounted substantially at the midpoint of bar 106, as shown in Figs. 6 and 7. When carrier 101 is transported to carrier unloading station B, projection 234 raises a roller 236 which projects inwardly from and is rotatably mounted on a shaft 241 that is rigidly fastened to the center portion of lever arm 220. When roller 236 is raised by projection 234, roller 236, arm 220 and links 225 and 230 assume the dotted line position shown in Fig. 4, whereupon switch 237 is actuated and maintained in the actuated position as long as rack 101 remains at carrier unloading station B.

A third switching means 238 is mounted on angle bar 22 at unloading station B and comprises two conventional switches 239 and 240 which are positioned in vertical planes so as to be actuated by the movement of contacting elements 214 and 216 when carrier 101 is being raised during the unloading operation. Switch 240 is in a spaced vertical plane from switch 239 with respect to supporting angle bar 22. In this manner switch 240 is adapted to be actuated by contacting elements 216 while switch 239 is adapted to be actuated by contacting elements 214.

A fourth switching means 242 is mounted on elevated frame structure 66. As seen in Fig. 9 fourth switching 242 embodies conventional switches 243 and 244 adjacently mounted on a plate 246 on the rear portion of side panel 142 and a conventional switch 247 mounted on a plate 248 on the front portion of side panel 142. As seen in Fig. 2 switches 243, 244 and 247 are located in the right hand side of frame 66. Projecting elements 249 and 251 are fastened on the end of cross bracket 154 nearest switches 243, 244 and 247. Projecting element 249 is positioned rearwardly of projecting element 251 and will simultaneously actuate both switches 243 and 244 when sliding assembly 155 is in fully retracted position as shown in Fig. 2. Projecting element 251 will actuate switch 247 when sliding assembly 155 is in fully extended position as shown in Fig. 12.

A fifth swtiching means 252 is located at carrier removal station C and is constructed in substantially the same manner as first switching means 49. A bumper lever 253 corresponds to bumper lever 53, and the presence of a carrier rack 101 at station C will pivot bumper 253 to thereupon actuate a switch 254 in the same manner as switch 63 is actuated.

In addition to the switching means previously described additional switches 256 and 257 are positioned on angle bar 22 at carrier unloading station B. Switch 256 is adapted to be actuated by contacting element 217, and switch 257 is adapted to be actuated by a plunger 258 that is operated by vertical movement of longitudinal bar 76. It will be seen that switch 257 is actuated only when bar 76 is at its lowest vertical position.

Figure 14:
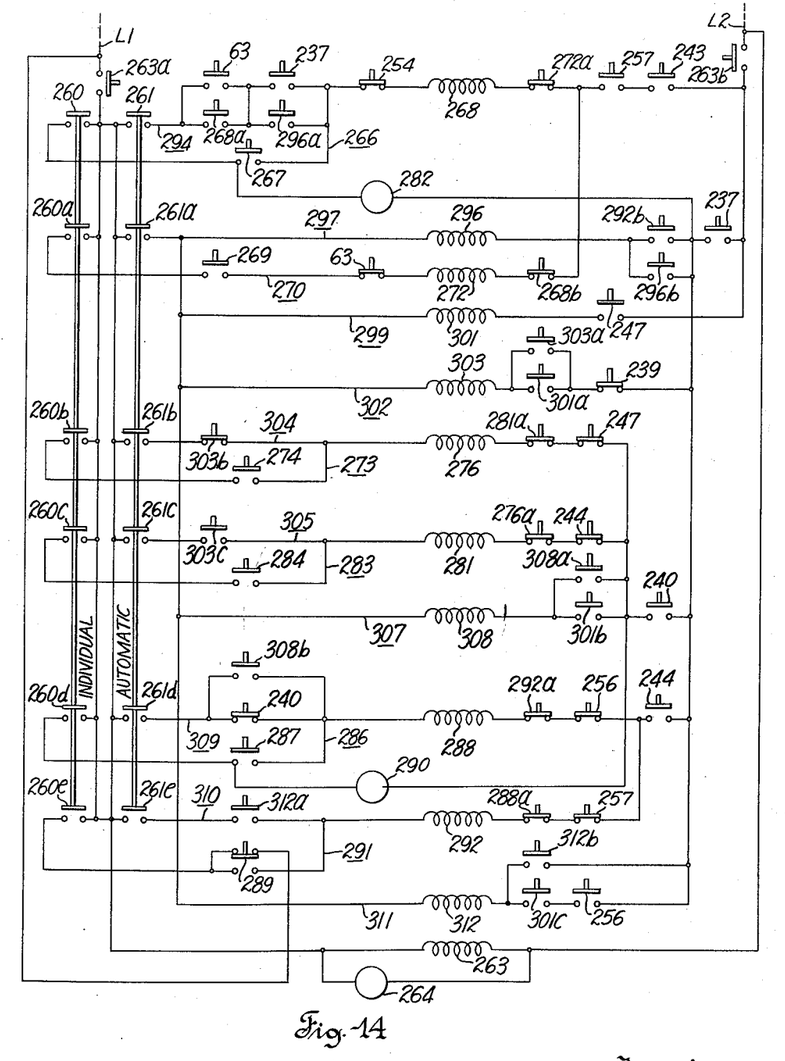
Fig. 14 is a schematic view showing the electrical control system for the unloading machine.

The operational circuit which can control either individual unloading or continuous automatic unloading of carriers, such as carrier rack 101, is shown in the schematic diagram of Fig. 14. L1 and L2 represent the power lines. The usual overload relays are understood to be installed in the power lines, but are not shown for simplification purposes. Manual or individual operation is initiated through switches 260, 260a, 260b, 260c, 260d and 260e, which are locked together to be actuated in a single operation. Automatic operation is initiated through switches 261, 261a, 261b, 261c, 261d, and 261e, which are locked together to be actuated in a single operation. The power circuit through L1, L2 includes coil 263 and associated interlock switches 263a and 263b. A green light 264 is connected in parallel with coil 263 to indicate energization thereof.

The separate circuits of Fig. 14 can be designated as either "individual" or "automatic." The individual circuits are utilized for individual unloading of a single carrier, and separate switches or push buttons must be actuated for each phase of the unloading operations. The automatic circuits are utilized for an automatically continuing unloading cycle for any desired number of carrier racks.

In Fig. 14 the individual conveyor forward circuit 266 is seen to include L1, interlock switch 263a, individual switch 260, push button switch 267, normally closed switch 254, forward rotation magnet coil 268 of the motor starter for motor 39, normally closed interlock switch 272a, normally open switch 257, normally open switch 243, interlock switch 263b and L2.

The individual conveyor reverse circuit 270 includes L1, interlock switch 263a, individual switch 260a, push button switch 269, normally closed switch 63, reverse rotation magnet coil 272 of the motor starter for motor 39, normally closed interlock switch 268b, normally open switch 257, normally open switch 243, interlock switch 263b and L2.

The individual pusher forward circuit 273 includes L1, interlock switch 263a, individual switch 260b, push button switch 274, forward rotation magnet coil 276 of the motor starter for motor 169, normally closed interlock switch 281a, normally closed switch 247, normally open switch 240, normally open switch 237, interlock switch 263b and L2. A red light 282 is connected between push button switch 267 and switch 237.

The individual pusher reverse circuit 283 includes L1, interlock switch 263a, individual switch 260a, push button switch 284, reverse rotation magnet coil 281 of the motor starter for motor 169, normally closed interlock 276a, normally closed switch 244, normally open switch 240, normally open switch 237, interlock switch 263b and L2.

The individual elevator lift circuit 286 includes L1, interlock switch 263a, individual switch 260d, push button switch 287, lift rotation magnet coil 288 of the motor starter for motor 128, normally closed interlock switch 292a, normally closed switch 256, normally open switch 244, normally open switch 237, interlock switch 263b and L2. A red light 290 is connected between push button switch 287 and switch 240.

The individual elevator lower circuit 291 includes L1, interlock switch 263a, individual switch 260e, push button 289, lower rotation magnet coil 292 of the motor starter for motor 128, normally closed interlock switch 288a, normally closed switch 257, normally open switch 244, normally open switch 237, interlock switch 263b and L2.

The automatic conveyor forward circuit 294 includes L1, interlock switch 263a, automatic switch 261, normally open switch 63, normally closed switch 237, normally closed switch 254, coil 268, normally closed interlock switch 272a, normally open switch 257, normally open switch 243, interlock switch 263b and L2. Connected in parallel with switch 63 and 237 are normally open interlock switches 268a and 296a.

A conveyor reverse circuit is not required in automatic operation, but to maintain the continuous automatic operation there is a separate circuit 297 which includes L1, interlock 263a, automatic switch 261a, coil 296, normally open interlock switch 292b, normally open switch 237, interlock switch 263b and L2. Normally open interlock switch 296b is connected in parallel with switch 292b.

An additional circuit 299 for automatic operation includes L1, interlock 263a, automatic switch 261a, coil 301, normally open switch 247, interlock 263b and L2.

A further circuit 302 for automatic operation includes L1, interlock 263a, automatic switch 261a, coil 303, normally open interlock switch 301a with normally open interlock switch 303a connected in parallel, normally closed switch 239, normally open switch 237, interlock switch 263b and L2.

An additional circuit 307 for automatic operation includes L1, interlock 263a, automatic switch 261a, coil 308, normally open interlock switch 301b with normally open interlock switch 308a connected in parallel, normally open switch 240, normally open switch 237, interlock switch 263b and L2.

A still further circuit for automatic operation 311 includes L1, interlock switch 263a, automatic switch 261a, coil 312, normally open interlock switch 301c and normally open switch 256 with normally open interlock switch 312b connected in parallel, normally open switch 237, interlock switch 263b and L2.

The automatic pusher forward circuit 304 includes L1, interlock switch 263a, automatic switch 261b, normally closed interlock 303b, coil 276, normally closed interlock 281a, normally closed switch 247, normally open switch 240, normally open switch 237, interlock switch 263b and L2.

The automatic pusher reverse circuit 305 includes L1, interlock switch 263a, automatic switch 261c, normally open interlock switch 303c, coil 281, normally closed switch 276a, normally closed switch 244, normally open switch 240, normally open switch 237, interlock switch 263b and L2.

The automatic elevator lift circuit 309 includes L1, interlock switch 263a, automatic switch 261d, normally closed switch 240 with normally open interlock switch 308b connected in parallel, coil 288, normally closed interlock switch 292a, normally closed switch 256, normally open switch 244, normally open switch 237, interlock switch 263b and L2.

The automatic elevator lower circuit 310 includes L1, interlock switch 263a, automatic switch 261e, normally open interlock switch 312a, coil 292, normally closed interlock switch 288a, normally closed switch 257, normally open switch 244, normally open switch 237, interlock switch 263b and L2.

Figure 10:
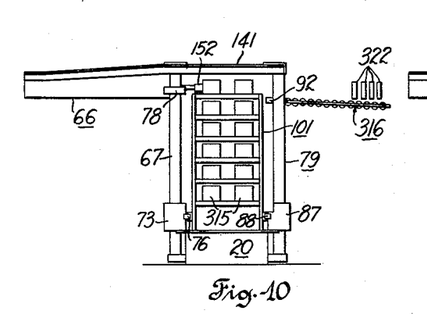
Figs. 10, 11 and 12 are end views of a simplified representation of the unloading machine showing various stages in the unloading operation of a carrier rack.

An individual unloading operation of the unloading machine will now be described. A rack 101 loaded with concrete blocks 315, as shown in Fig. 10, is placed on receiving station A. The operator will close the combined individual switches 260, 260a, 260b, 260c, 260d and 260e energizing coil 263 and closing interlock switches 263a and 263b. Green light 264 will be lighted indicating power is available, and the machine is ready for individual push button operation.

The operator will press conveyor forward push button 267. Circuit 266 is now complete as switches 243 and 257 are closed with pusher assembly 155 in fully retracted position and the elevator assembly 110 in fully lowered position. Coil 268 in circuit 266 is thereupon energized and motor 39 moves conveyor 21 forward. When the rack 101 reaches unloading station B, switch 237 is thereupon closed and the operator will be warned by the lighting of red light 282. If rack 101 travels past station B, the operator can press conveyor reverse push button 269 completing circuit 270 and energizing coil 272 to cause motor 39 to move conveyor 21 in reverse so it will be positioned where red light 282 remains lit.

With loaded rack 101 at station B the operator will press pusher forward push button 274. Circuit 273 is now complete as switch 240 is closed when the rack is not being elevated. Coil 276 is thereupon energized and motor 169 moves pushers 152 forward to unload one level of blocks 315 as shown in unloading sequences in Figs. 10, 11 and 12. Pushers 152 will automatically stop at the end of the stroke as switch 247 will open at that time. When blocks 315 are being pushed off pallets 108 by pusher bars 152, it will be noticed that the oblique sides 95 and 97 (Fig. 13) guide the blocks onto discharge conveyor 316 (Fig. 2). Pallets 108 will abut protuberances 93 and remain on rack 101, or as described hereinbefore, pallets 108 may be removed from rack 101 by the return stroke of pusher bars 152 or pallets 108 may also be pushed onto discharge conveyor 316, if desired.

The operator will now press pusher reverse push button 284 completing circuit 283 so as to energize coil 281 so that motor 169 moves pusher bars 152 in reverse to the retract position.

Figure 11:
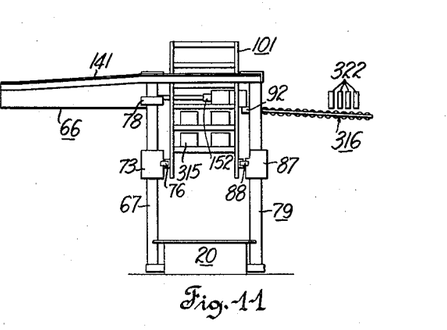

Fig. 11 illustrates pushers 152 in partly extended position the concrete block onto discharge conveyor 316. As shown in Fig. 2 discharge conveyor 316 comprises a large flat section 318 adjacent brace 92 and extending between one set of connecting parts 146. Conventional conveyor rollers 319 extend transversely of conveyor 316 and as seen in Figs. 10, 11 and 12 conveyor 316 slopes downwardly to allow for a continuing gravity feed movement of blocks 315 from the unloading machine. As blocks 315 are spaced from each other on pallets 108, it is desired to move the blocks inwardly to be in abutting relationship with each other on conveyor 316 so a smaller size conveyor section 321 can be used to further transport the blocks. For moving the blocks inwardly vertical rollers 322 are mounted at an oblique angle on section 318, and the blocks 315 are forced thereby inwardly into abutting relationship to fit on smaller section 321. Vertical rollers 322 may be spring mounted for horizontal movement on conveyor 316 to counter the impact of the unloaded blocks.

Now that one row of blocks have been unloaded, the operator will press elevator lift push button 287 completing circuit 286 as switch 244 is closed in fully retracted position so coil 288 is energized and motor 128 elevates rack 101. Switch 237 is maintained closed while rack 101 is lifted, as described hereinbefore. Contacting elements 214 are so positioned that when they actuate switch 240, red light 290 will be lighted, indicating the next row of blocks are positioned to be unloaded by pusher bars 152. If rack 101 is lifted too high, the operator can press elevator lower push button 289 completing circuit 291 and energizing coil 292 to cause motor 128 to lower rack 101 until red light 290 stays lit.

The pushing and elevating operations are repeated in the manner outlined above until rack 101 is completely unloaded and positioned, as shown in Fig. 12. Elevator lower push button 289 can now be pressed and held down until the elevator assembly 110 is lowered back to conveyor 21 where it will be stopped as switch 257 opens.

The operator will now press conveyor forward push button 267 and conveyor 21 will transport unloaded rack 101 to removal station C. Conveyor 21 will stop when rack 101 bumps lever 253 and opens switch 254. The unloaded rack can now be removed from the machine.

The automatic operation of the unloading machine will now be described. The operator will first close combined individual switches 260, 260a, 260b, 260c, 260d and 260e to energize coil 263 and close interlocks 263a and 263b. The green light 264 will now be lighted and the operator can close combined automatic switches 261, 161a, 261b, 261c, 261d and 261e. A loaded rack 101 is placed on receiving station A pivoting bumper 53 and closing switch 63. Automatic conveyor forward circuit 294 is now complete and coil 268 energized as switches 243 and 257 are also closed at this time as explained in connection with the individual operation. Normally open interlock switch 268a is now closed and normally closed interlock switch 268b is opened as coil 268 is energized. It should be kept in mind that there is no rack at removal station C so that switch 254 remains closed. Conveyor 21 now automatically moves rack 101 forward until the rack arrives at unloading station B where projection 234 actuates switch 237 thereby opening circuit 294 and stopping the motion of conveyor 21.

Automatic pusher forward circuit 304 is now complete and coil 276 energized as switch 247 included therein is closed and switch 240 is closed when rack 101 is not being lifted. Energized coil 276 opens normally closed interlock 276a in automatic pusher reverse circuit 305. As pusher bars 152 move forward unloading one level of of concrete blocks, switches 243 and 244 are actuated. When pusher bars 152 reach the end of the unloading stroke, switch 247 is actuated. Normally closed switch 247 thereupon opens and breaks circuit 304, thus stopping the forward motion of pusher bars 152. Normally open switch 247 in circuit 299 closes and energizes coil 301 which closes normally open interlock switch 301a. Closing of interlock switch 301a completes circuit 302 and energizes coil 303 which closes normally open interlock switches 303a and 303c and opens normally closed interlock switch 303b. Automatic pusher reverse circuit 305 is now complete by closing of interlock switch 303c which energizes coil 281 to reverse the motion of pusher bars 152. Energizing of coil 281 opens normally closed interlock 281a in automatic pusher forward circuit 304. This movement of pusher bars 152 back from the extended position actuates switch 247 to its normal position.

When pusher bars 152 reach the fully retracted position, switches 243 and 244 are actuated to their normal position. However, automatic pusher forward circuit 304 cannot be completed to energize coil 276 as interlock switch 303b is now open. As pointed out hereinbefore, interlock switch 301b is now closed so circuit 307 is complete as normally open switch 240 is closed when contacted by elements 216, thus energizing coil 308 and closing normally open interlock switches 308a and 308b. Automatic elevator lift circuit 309 is complete, for although normally closed switch 240 is open, the circuit can be made through closed interlock switch 308b to energize coil 288 to lift rack 101. Energizing coil 288 also opens normally closed interlock switch 288a in automatic elevator lower circuit 310. Lifting of the elevator assembly 110 actuates switches 239 and 240 which opens circuits 302 and 307. However, lifting circuit 309 is maintained as normally closed switch 240 now is closed although interlock switch 308b opens. When switches 239 and 240 are actuated by the next set of contacting elements 214 and 216, circuit 309 is open as normally closed switch 240 opens and the lifting action stops with the next level of blocks ready to be unloaded by pusher bars 152. As previously mentioned elements 214 and 216 are so positioned as to raise the elevator assembly 110 the vertical distance between each row of blocks. Since coil 303 is now deenergized in circuit 302, normally closed interlock 303b is closed and automatic pusher forward circuit will be closed again. Accordingly, it is seen that the above described unloading and lifting action can now be automatically repeated for each level of blocks until rack 101 is completely unloaded. Although only six rows of blocks are shown necessitating six unloading operations and five lifting operations, it should be understood that any desired number of consecutive unloading operations could be obtained by incorporating the required number of sets of contacting elements 214 and 216 on chain 213.

When rack 101 is lifted to the level which unloads the last row of blocks as shown in Fig. 12, switch 256 is actuated by element 217. Normally closed switch 256 in lifting circuit 309 is opened which opens lifting circuit 309. Pusher bars 152 will now go through a complete cycle of extending and retracting to unload the last level of blocks. As normally open interlock switch 301c and switch 256 are now closed, circuit 311 is completed and coil 312 is energized to close normally open interlock switches 312a in lowering circuit 310 and 312b in circuit 311. Automatic elevator lowering circuit 310 is completed, thus energizing coil 292 to start lowering elevator assembly 110 and rack 101. Contacting elements 214 are of the bypass type as seen by the particular confiiguration in Fig. 5 which allows elements 214 to roll over switch 239 without actuating the switch as elevator assembly 110 and rack 101 lowers. At this same time energization of coil 292 will open normally closed interlock switch 292a in lifting circuit 309 and close normally open interlock switch 292b in circuit 297 so that circuit 297 is now completed, thus energizing coil 296 and closing normally open interlock switch 296a in conveyor forward circuit 294 and normally open interlock switch 296b in circuit 297.

While the elevator assembly and rack 101 are lowering, pusher bars 152 remain stationary in fully retracted position as normally closed interlock switch 303b is open since coil 303 is still energized. During the lowering operation, switch 256 is actuated to normal position and switch 240 is also actuated so circuit 307 opens. Elevator assembly 110 with bars 76 lowers to conveyor 21 and actuates switch 257 which opens lowering circuit 310 and stops the downward motion. Switch 240 is again actuated.

If a second loaded rack has been placed at receiving station A during the unloading operation, conveyor 21 will now move forward as circuit 294 is complete through closed interlock switch 296a. Upon movement of unloaded rack 101 from station B to station C, normally open switch 237 returns to its normal open position and opens circuits 297, 302 and 311 so the original operating conditions will be established preparatory to receiving the next loaded rack at station B.

When unloaded rack 101 reaches removal station C, bumper lever 253 is pivoted, opening switch 254 and stopping conveyor 21. Unitl the unloaded rack is removed, circuit 294 cannot be closed to move conveyor 21.

During the automatic unloading of a first carrier rack 101 at station B as described previously, a second carrier rack in loaded condition has been placed on receiving station A. After the first rack has been raised, unloaded and lowered to the conveyor, the conveyor will be activated transporting the first carrier to removal station C and the second carrier to unloading station B. Automatic unloading of the second carrier commences in the same manner as described in connection with the first loaded carrier. During this unloading operation of the second carrier, the operator will place a third loaded rack on receiving station A, and upon removal of the first unloaded rack from conveyor 21, the conveyor movement will again start to transport the third rack to carrier unloading station B. Accordingly, it is seen that a continuously automatic cyclic unloading operation of an unlimited number of carrier racks is possible. As each rack is being unloaded at station B, the operator places a loaded rack at station A and then removes the unloaded rack from station C. There is no break in the unloading operation while a new loaded rack is being added and an unloaded rack is being removed. As the unloaded rack leaves unloading station B, the next loaded rack is moving into unloading station B to start the unloading operation, and this can all be handled by one operator, as he determines the conveyor movement only when he removes the unloaded rack from carrier removal station C. When the last rack is to be removed, it will be noted that automatic operation cannot be used since there is no loaded rack available to be placed at station A to complete the conveyor forward circuit. In such case the last rack is removed by individual push button operation.

The speed of the conveyor 21 and the unloading operation can be varied by changing the motor speeds or gear ratios so that a desired number of racks can be unloaded in a predetermined amount of time. Normally in a block making installation the racks are continually moving in the block making cycle of receiving the green blocks on pallets, curing the blocks in a kiln and unloading the blocks. In this cycle the production schedule is determined by the availability of the unloaded racks to have the next group of green blocks placed thereon. However, in the present invention the speed of the unloading machine can be set so that a normal day's production can be unloaded in a fraction of the time previously needed. This greatly increases the production of the block making installation as more block making machines can be installed, for the capacity of the unloading machines will insure a sufficient number of unloaded racks being available to receive the greater capacity of green blocks.

In some installations it may be desirable to load and unload rack 101 positioned on conveyor 21 from the side of the unloading machine. In such case the guide posts 47 and guide panel 48 mounted on the side of the machine on which elevated frame 66 extends are removed. Rack 101 can now be placed on carrier receiving station A from the side position and when in place rack 101 will close switching means 49 as previously described to start the forward motion of conveyor 21. Unloading of the empty rack 101 can also be accomplished from the side of the machine at carrier removal station C. In such case switching means 252 is disconnected, for starting to remove rack 101 would close switch 254 and start conveyor 21 before the rack was completely clear of the unloading machine. To handle the side removal of rack 101 a pull chain switch (not shown) is installed within reach of the operator, and when the rack 101 in unloaded condition is clear of the unloading machine, this pull chain switch can be actuated to allow movement of conveyor 21.

A number of safety factors are present in the machine. As previously pointed out conveyor 21 will not move until the unloaded rack is removed from station C. Also the coils in each circuit have associated interlock switches in opposing circuits, such as the forward and reverse circuits. Thus energization of the coil in one circuit will open the opposing circuit to prevent damage to the machine.

In additional to the new unloading machine described hereinbefore, it is also believed that a new method of unloading a carrier is herein disclosed. This new method comprises the steps of placing a first carrier 101 loaded with materials at different levels at receiving station A on a conveyor 21, transporting first carrier 101 to unloading station B, stopping conveyor 21, unloading the top level of material by a transverse pushing action, alternating elevating said first carrier in increments corresponding to loaded levels and unloading each level with the transverse pushing action, lowering the first carrier in a continuous movement to conveyor 21, placing a loaded second carrier at station A during the unloading of the first carrier, transporting the unloaded first carrier to a removal station C at the same time transporting the second carrier to station B, unloading the second carrier in the same manner as the first carrier was unloaded, placing a third loaded carrier at station A during the unloading of the second carrier, removing said first carrier from removal station C and continuing the unloading operation of a plurality of carriers placed individually at receiving station A as the preceding carrier is being unloaded and the carrier next preceding then being removed from removal station C.

Although this invention has been described with reference to concrete block, it is not to be considered so limited as other materials in other industries can be similarly unloaded if it can be placed on a carrier and adapted for horizontal unloading in vertical increments. In addition it should be point out that although a mechanical cable means operates the pusher assembly, other means could be used, such as hydraulic rams or compressed air without departing from the scope of the invention.

The particular embodiments of the invention illustrated and described are to be considered illustrative only. The present invention includes such other modifications and equivalents as may readily occur to those skilled in the art, within the scope of the appended claims.

It is claimed and desired to secure by Letters Patent:

1. Apparatus for unloading a carrier having cured masonry blocks placed thereon at a plurality of vertical levels, said apparatus selectively actuable to effect a series of unloading operations, either individually or in a continuous automatic manner, comprising a longitudinally extending frame having an endless conveyor mounted thereon with a carrier receiving station at one end of said frame adapted to have a first carrier in loaded condition placed thereon, a first switching means located at said one end of said frame for actuation by said placement of said first carrier to provide longitudinal movement to said conveyor, said conveyor operable to transport said first carrier from said one end to a carrier unloading station intermediate the ends of said frame, a second switching means located at said carrier unloading station and adapted to automatically stop said conveyor movement when actuated by the positioning of said first carrier at said carrier unloading station, hollow supporting members mounted on said frame and extending upwardly therefrom at said carrier unloading station, longitudinal bars slidably mounted on the outside of said supporting members for vertical movement relative thereto, said longitudinal bars adapted to engage with corresponding parts on said first carrier when said first carrier is positioned at said carrier unloading station, a plurality of flexible drive means corresponding in number to and slidably connected with said supporting members, each having one end thereof fastened to a first motor driven drum and extending upwardly therefrom along the outside of said supporting members and having the other end thereof fastened to said longitudinal bars and extending upwardly therefrom within said hollow supporting members, said drive means actuated by the positioning of said first carrier in said carrier unloading station to elevate said first carrier to predetermined successively higher levels, an elevated frame structure mounted on the upper ends of said support members at a horizontal level substantially corresponding to the topmost level of said blocks on said first carrier, part of said elevated frame structure extending transversely to one side of said longitudinally extending frame, pusher bars mounted to slide within said elevated frame structure in a transverse back and forth movement relative to said longitudinally extending frame for pushing blocks off said first carrier at each of said predetermined levels, said conveyor being in fixed position relative to said frame and adapted to have a second loaded carrier placed thereon at said one end of said frame during the unloading of said first carrier, control means connected with said drive means to actuate said drive means for elevation of said longitudinal bars to each successively higher predetermined level upon completion of each individual back and forth transverse movement of said pusher bars when said first carrier is at said carrier unloading station, said conveyor further adapted to transport said first carrier in unloaded condition from said carrier unloading station to a carrier removal station at the other end of said frame at the same time said second carrier is transported from said carrier receiving station to said carrier unloading station.

2. Apparatus for unloading a carrier having a plurality of flat horizontal sections removably positioned thereon, said sections being vertically spaced a predetermined distance and parallel to each other, each of said sections having a plurality of cured masonry blocks placed thereon, said apparatus comprising a longitudinally extending frame having an endless longitudinal conveyor driven by a first power unit and adapted to transport a block loaded carrier from one end of said frame to a carrier unloading station intermediate the ends of said frame, vertically extending supporting members mounted on said frame on either side of said unloading station, vertically movable means operable by a second power unit to be driven vertically upwards along the outside of said supporting members to elevate said loaded carrier at said unloading station, additional means mounted on said vertically movable means to effect said elevation in increments corresponding to the spacing of said sections, horizontally movable pusher bars mounted on the upper ends of said supporting members and operable by a third power unit to be driven transversely of said frame from one side thereof to the other side and return, a longitudinal brace extending between the supporting members on the other side of said frame, said brace vertically positioned at substantially the same level as said pusher bars and having a plurality of recessed portions intermediate the ends of said brace, said pusher bars operable to completely unload all of the masonry blocks on each of said sections in a single transverse movement when said carrier is at said carrier unloading station, elongated hinged members mounted on the bottom of each pusher bar and adapted to slide along the top of said sections when said blocks are being pushed by said transverse movement of said pusher bars, said elongated hinged members further adapted to extend downwardly into said recessed portions when said pusher bars have completed said transverse movement and said elongated hinged members further adapted to engage one end of said sections to drivingly push said sections during said return transverse movement of said pusher bars to be collected in a predetermined manner, switching means adapted to actuate said power units, a plurality of contacting elements associated with said vertically movable means and adapted to sequentially contact said switching means to effect alternate actuation of said horizontal pusher bars and vertical movable means, the final one of said elements in the sequence actuating said switching means to completely lower and replace said carrier on said conveyor in a continuous vertical movement.

3. An unloading apparatus capable of substantially continuous automatic unloading of masonry block positioned on a plurality of carriers at a plurality of vertical levels comprising a longitudinally extending frame having an endless conveyor mounted thereon with a carrier receiving station located at one end, a carrier removal station located at the other end and a carrier unloading station located intermediate the ends thereof; a first switching means located at said carrier receiving station for actuation by the placement of a first carrier in loaded condition thereon to effect movement of said conveyor to transport said first carrier to said carrier unloading station, a second switching means located at said carrier unloading station to stop said conveyor movement when actuated by the positioning of said first carrier at said carrier unloading station, supporting members mounted on said frame and extending upwardly therefrom at said unloading station, longitudinal bars slidably mounted on said supporting members for vertical movement relative thereto, said longitudinal bars adapted to engage with corresponding parts on said first carrier when said first carrier is positioned at said carrier unloading station, a third switching means located at said carrier unloading station automatically actuated when said first carrier is at said carrier unloading station to effect positioning of said carrier at predetermined successively higher levels, an elevated frame structure mounted on the upper ends of said support members at a horizontal level substantially corresponding to the topmost level of said blocks on said first carrier and extending transversely to one side of said longitudinally extending frame, pusher bars mounted to slide within said elevated frame structure in a transverse back and forth movement relative to said longitudinally extending frame for pushing blocks off said first carrier at each of said predetermined levels, said conveyor being in fixed position relative to said frame and adapted to have a second loaded carrier placed on said carrier receiving station during the unloading of said first carrier, a fourth switching means located on said elevated frame and actuable when said first carrier is at each of said vertical levels to effect said transverse back and forth movement of said pusher bars, said conveyor further adapted to transport said first carrier in unloaded condition from said carrier unloading station to said carrier removal station at the same time said second carrier is transported from said carrier receiving station to said carrier unloading station, said second switching means adapted to automatically stop said conveyor movement when actuated by the positioning of said second carrier at said carrier unloading station, and a fifth switching means located at said carrier removal station and adapted to start the movement of said conveyor when actuated by the removal of said first carrier in unloaded condition from said carrier removal station after a third carrier in loaded condition is placed on said conveyor at said carrier receiving station to actuate said first switching means.

4. Apparatus for unloading a carrier having cured masonry blocks placed thereon at a plurality of vertical levels, said apparatus selectively actuable to effect a series of unloading operations, either individually or in a continuous automatic manner, comprising a longitudinally extending frame having an endless conveyor mounted thereon with a carrier receiving station at one end of said frame adapted to have a first carrier in loaded condition placed thereon, a first switching means located at said one end of said frame for actuation by said placement of said first carrier to provide longitudinal movement to said conveyor, said conveyor operable to transport said first carried from said one end to carrier unloading station intermediate the ends of said frame, a second switching means located at said carrier unloading station and adapted to automatically stop said conveyor movement when actuated by the positioning of said first carrier at said carrier unloading station, hollow supporting members mounted on said frame and extending upwardly therefrom at said carrier unloading station, longitudinal bars slidably mounted on the outside of the supporting members for vertical movement relative thereto, said longitudinal bars adapted to engage with corresponding parts on said first carrier when said first carrier is positioned at said carrier unloading station, a plurality of flexible drive means corresponding in number to and slidably connected with said supporting members, each having one end thereof fastened to a first motor driven drum and extending upwardly therefrom along the outside of said supporting members and having the other end thereof fastened to said longitudinal bars and extending upwardly therefrom within said hollow supporting members, said drive means actuated by the positioning of said first carrier in said carrier unloading station to elevate said first carrier to predetermined successively higher levels, an elevated frame structure mounted on the upper ends of said support members at a horizontal level substantially corresponding to the topmost level of said blocks on said first carrier, part of said elevated frame structure extending transversely to one side of said longitudinally extending frame, pusher bars mounted to slide within said elevated frame structure in a transverse back and forth movement relative to said longitudinally extending frame for pushing said blocks off said first carrier at each of said predetermined levels, said conveyor being in fixed position relative to said frame and adapted to have a second loaded carrier placed thereon at said one end of said frame during the unloading of said first carrier, control means connected with said drive means to actuate said drive means for elevation of said longitudinal bars to each successively higher predetermined level upon completion of each individual back and forth transverse movement of said pusher bars when said first carrier is at said carrier unloading station; said control means comprising a second motor driven drum driving said pusher bars and an endless chain mounted on said frame and actuated by the vertical movement of said longitudinal bars, said chain having a plurality of contacting elements fastened thereon with a predetermined spacing therebetween, said contacting elements adapted to sequentially actuate said first and second motor driven drums to alternately effect said predetermined increments of elevational movement and said transverse back and forth movements; said conveyor further adapted to transport said first carrier in unloaded condition from said carrier unloading station to a carrier removal station at the other end of said frame at the same time said second carrier is transported from said carrier receiving station to said carrier unloading station.

5. An unloading apparatus capable of substantially continuous automatic unloading of masonry block positioned on a plurality of carriers at a plurality of vertical levels; comprising a longitudinally extending frame having an endless conveyor mounted thereon with a carrier receiving station located at one end, a carrier removal station located at the other end and a carrier unloading station located intermediate the ends thereof; a first switching means located at said carrier receiving station for actuation by the placement of a first carrier in loaded condition thereon to effect movement of said conveyor to transport said first carrier to said carrier unloading station, a second switching means located at said carrier unloading station to stop said conveyor movement when actuated by the positioning of said first carrier at said carrier unloading station, supporting members mounted on said frame and extending upwardly therefrom at said unloading station, longitudinal bars slidably mounted on said supporting members for vertical movement relative thereto, said longitudinal bars adapted to engage with corresponding parts on said first carrier when said first carrier is positioned at said carrier unloading station, a third switching means located at said carrier unloading station automatically actuated when said first carrier is at said carrier unloading station to effect positioning of said carrier at predetermined successively higher levels, an elevated frame structure mounted on the upper ends of said support members at a horizontal level substantially corresponding to the topmost level of said blocks on said first carrier and extending transversely to one side of said longitudinally extending frame, unloading devices mounted to slide within said elevated frame structure in a transverse back and forth movement relative to said longitudinally extending frame for pushing blocks off said first carrier at each of said predetermined levels, said conveyor being in fixed position relative to said frame and adapted to have a second loaded carrier placed on said carrier receiving station during the unloading of said first carrier, a fourth switching means located on said elevated frame and actuable when said first carrier is at each of said vertical levels to effect said transverse back and forth movement of said unloading devices, said conveyor further adapted to transport said first carrier in unloaded condition from said carrier unloading station to said carrier removal station at the same time said second carrier is transported from said carrier receiving station to said carrier unloading station, said second switching means adapted to automatically stop said conveyor movement when actuated by the positioning of said second carrier at said carrier unloading station, and a fifth switching means located at said carrier removal station and adapted to start the movement of said conveyor when actuated by the removal of said first carrier in unloaded condition from said carrier removal station after a third carrier in loaded condition is placed on said conveyor at said carrier receiving station to actuate said first switching means.

6. An unloading apparatus capable of substantially continuous automatic unloading of masonry block positioned on a plurality of carriers at a plurality of vertical levels; comprising a longitudinally extending frame having an endless conveyor mounted thereon with a carrier receiving station located at one end, a carrier removal station located at the other end and a carrier unloading station located intermediate the ends thereof; a first switching means located at said carrier receiving station for actuation by the placement of a first carrier in loaded condition thereon to effect movement of said conveyor to transport said first carrier to said carrier unloading station, a second switching means located at said carrier unloading station to stop said conveyor movement when actuated by the positioning of said first carrier at said carrier unloading station, supporting members mounted on said frame and extending upwardly therefrom at said unloading station, longitudinal bars slidably mounted on said supporting members for vertical movement relative thereto, said longitudinal bars adapted to engage with corresponding parts on said first carrier when said first carrier is positioned at said carrier unloading station, a third switching means located at said carrier unloading station automatically actuated when said first carrier is at said carrier unloading station to effect positioning of said carrier at predetermined successively higher levels, an elevated frame structure mounted on the upper ends of said support members at a horizontal level substantially corresponding to the topmost level of said blocks on said first carrier and extending transversely to one side of said longitudinally extending frame, pusher bars mounted to slide within said elevated frame structure in a transverse back and forth movement relative to said longitudinally extending frame for pushing blocks off said first carrier at each of said predetermined levels, said conveyor being in fixed position relative to said frame and adapted to have a second loaded carrier placed on said carrier receiving station during the unloading of said first carrier, a fourth switching means located on said elevated frame and actuable when said first carrier is at each of said vertical levels to effect said transverse back and forth movement of said pusher bars, said conveyor further adapted to transport said first carrier in unloaded condition from said carrier unloading station to said carrier removal station at the same time said second carrier is transported from said carrier receiving station to said carrier unloading station, said second switching means adapted to automatically stop said conveyor movement when actuated by the positioning of said second carrier at said carrier unloading station, a fifth switching means located at said carrier removal station and adapted to start the movement of said conveyor when actuated by the removal of said first carrier in unloaded condition from said carrier removal station after a third carrier in loaded condition is placed on said conveyor at said carrier receiving station to actuate said first switching means, a first power unit mounted on said longitudinally extending frame and actuated by said first, second and fifth switching means for starting and stopping said conveyor, a second power unit mounted on said longitudinally extending frame and actuated by said third switching means to vertically lift said longitudinal bars, and a third power unit mounted on said elevated frame structure and actuated by said fourth switching means to drive said pusher bars in said back and forth movement.

7. An unloading apparatus capable of substantially continuous automatic unloading of masonry block positioned on a plurality of carriers at a plurality of vertical levels; comprising a longitudinally extending frame having an endless conveyor mounted thereon with a carrier receiving station located at one end, a carrier removal station located at the other end and a carrier unloading station located intermediate the ends thereof; a first switching means located at said carrier receiving station for actuation by the placement of a first carrier in loaded condition thereon to effect movement of said conveyor to transport said first carrier to said carrier unloading station, a second switching means located at said carrier unloading station to stop said conveyor movement when actuated by the positioning of said first carrier at said carrier unloading station, supporting members mounted on said frame and extending upwardly therefrom at said unloading station, longitudinal bars slidably mounted on said supporting members for vertical movement relative thereto, said longitudinally bars adapted to engage with corresponding parts on said first carrier when said first carrier is positioned at said carrier unloading station, a third switching means located at said carrier unloading station automatically actuated when said first carrier is at said carrier unloading station to effect positioning of said carrier at predetermined successively higher levels, an elevated frame structure mounted on the upper ends of said support members at a horizontal level substantially corresponding to the topmost level of said blocks on said first carrier and extending transversely to one side of said longitudinally extending frame, pusher bars mounted to slide within said elevated frame structure in a transverse back and forth movement relative to said longitudinally extending frame for pushing blocks off said first carrier at each of said predetermined levels, a longitudinal brace extending between said supporting members on the side of said conveyor opposite to said extension of said elevated frame structure, said brace vertically positioned at substantially the same level as said pusher bars and having a plurality of protuberances extending from the upper side thereof, each of said sections adapted to abut said protuberances during each said transverse movement of said pusher bars so as to remain in position on said first carrier during the unloading of said masonry block from each level, said conveyor being in fixed position relative to said frame and adapted to have a second loaded carrier placed on said carrier receiving station during the unloading of said first carrier, a fourth switching means located on said elevated frame and actuable when said first carrier is at each of said vertical levels to effect said transverse back and forth movement of said pusher bars, said conveyor further adapted to transport said first carrier in unloaded condition from said carrier unloading station to said carrier removal station at the same time said second carrier is transported from said carrier receiving station to said carrier unloading station, said second switching means adapted to automatically stop said conveyor movement when actuated by the positioning of said second carrier at said carrier unloading station, and a fifth switching means located at said carrier removal station and adapted to start the movement of said conveyor when actuated by the removal of said first carrier in unloaded condition from said carrier removal station after a third carrier in loaded condition is placed on said conveyor at said carrier receiving station to actuate said first switching means.

8. An unloading apparatus capable of substantially continuous automatic unloading of masonry block positioned on a plurality of carriers at a plurality of vertical levels; comprising a longitudinally extending frame having an endless conveyor mounted thereon with a carrier receiving station located at one end, a carrier removal station located at the other end and a carrier unloading station located intermediate the ends thereof; a first switching means located at said carrier receiving station for actuation by the placement of a first carrier in loaded condition thereon to effect movement of said endless conveyor to transport said first carrier to said carrier unloading station, a second switching means located at said carrier unloading station to stop said endless conveyor movement when actuated by the positioning of said first carrier at said carrier unloading station, supporting members mounted on said frame and extending upwardly therefrom at said unloading station, longitudinal bars slidably mounted on said supporting members for vertical movement relative thereto, said longitudinal bars adapted to engage with corresponding parts on said first carrier when said first carrier is positioned at said carrier unloading station, a third switching means located at said carrier unloading station automatically actuated when said first carrier is at said carrier unloading station to effect positioning of said carrier at predetermined successively higher levels, an elevated frame structure mounted on the upper ends of said support members at a horizontal level substantially corresponding to the topmost level of said blocks on said first carrier and extending transversely to one side of said longitudinally extending frame, pusher bars mounted to slide within said elevated frame structure in a transverse back and forth movement relative to said longitudinally extending frame for pushing blocks off said first carrier at each of said predetermined levels, a transverse discharge conveyor extending transversely of said frame at substantially the same level as said pusher bars and in block receiving relation therewith, said transverse discharge conveyor having a first part adjacent said apparatus comprising a plurality of parallel receiving rollers, obliquely mounted means on said first part adapted to receive and effect abutting relationship of said blocks, said discharge conveyor having a second part with a smaller transverse dimension than said first part and adapted to receive from said first part and transport said blocks in abutting relationship, said endless conveyor being in fixed position relative to said frame and adapted to have a second loaded carrier placed on said carrier receiving station during the unloading of said first carrier, a fourth switching means located on said elevated frame and actuable when said first carrier is at each of said vertical levels to effect said transverse back and forth movement of said pusher bars, said endless conveyor further adapted to transport said first carrier in unloaded condition from said carrier unloading station to said carrier removal station at the same time said second carrier is transported from said carrier receiving station to said carrier unloading station, said second switching means adapted to automatically stop said endless conveyor movement when actuated by the positioning of said second carrier at said carrier unloading station, and a fifth switching means located at said carrier removal station and adapted to start the movement of said endless conveyor when actuated by the removal of said first carrier in unloaded condition from said carrier removal station after a third carrier in loaded condition is placed on said endless conveyor at said carrier receiving station to actuate said first switching means.

References Cited in the file of this patent

UNITED STATES PATENTS

| | | |
|---|---|---|
| 1,427,825 | Klein | Sept. 5, 1922 |
| 2,769,558 | Ehlers | Nov. 6, 1956 |
| 2,774,489 | Guigas | Dec. 18, 1956 |